E. R. Shepard,
Nut-Lock.

N° 102,600.     Patented May 3, 1870.

Witnesses
Aleg. Mahon
H. H. Doubleday

Inventor:
E. R. Shepard
by his attorney
A. M. Smith

United States Patent Office.

EDWIN R. SHEPARD, OF SCRANTON, PENNSYLVANIA.

Letters Patent No. 102,600, dated May 3, 1870.

IMPROVEMENT IN LOCK-NUT.

The Schedule referred to in these Letters Patent and making part of the same.

*To all whom it may concern:*

Be it known that I, EDWIN R. SHEPARD, of Scranton, Luzerne county, Pennsylvania, have invented certain new and useful Improvements in Compensating Lock-Nuts, of which the following is a full, clear, and exact description, reference being had to the accompanying drawing, in which—

Similar letters of reference indicate corresponding parts in all the figures.

Figure 1:
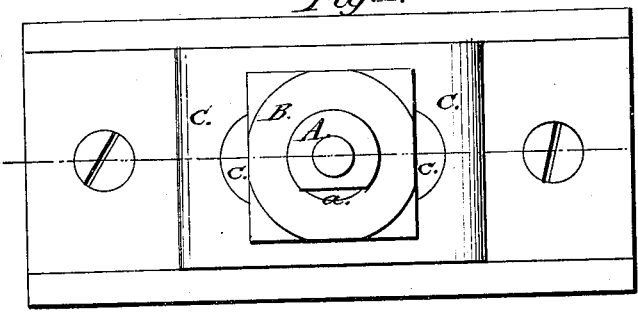
Figure 1 is a plan view of the nut, as applied.
Figure 2:
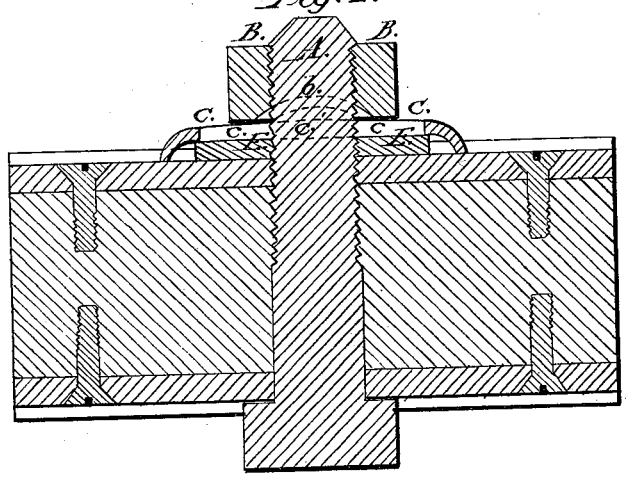
Figure 2 is a sectional view through the line $x\ y$, fig. 1.
Figure 3:
Figure 3 is a modification in the form of the washer, used in the other figures.

The invention relates to that class of lock-nuts in which the nut is prevented from backing off, by means of a rib upon the washer engaging with a corresponding groove in the inner face of the nut, or *vice versa*, and consist in first combining a supplemental washer with the elastic locking-washer heretofore used, for a purpose hereinafter explained.

Second, in locking the nut by means of a washer which is itself held from turning by the bolt passing through said washer and nut.

Third, in making the metallic locking-washer with an elongated slot extending nearly from end to end, for the purpose of relieving the tendency to break in the center when the nut is screwed down tightly.

In the drawing—

A represents a bolt of the ordinary construction, except that it is flattened upon one side, as shown at $a$, fig. 1, and is adapted to be held from turning by the material through which it passes.

B is the nut, provided upon its inner or lower face with a radial groove or grooves, $c$.

C is a metallic locking-washer, in which the slot $c$ extends nearly its entire length, making virtually two parallel springs of equal or nearly equal strength throughout, and tied together at their ends.

This spring is provided with a rib, $c'$, across its upper face, and adapted to engage with the groove $b$ in nut B.

D is a washer, made arching or concave to give it the desired elasticity.

The perforation $d$ is made flat at one side to correspond with the shape of the bolt B, and thus hold the washer from turning around.

This washer is also furnished with a rib, $d'$, for the purpose of locking a bolt upon it.

E is a supplemental washer, which may be either elastic or non-elastic, as required. The operation of my devices is as follows:

As the nut B is screwed down so as to hug the spring washer C or D, the rib $c$ or $d$ snaps into the groove $b$, and effectually prevents nut B from backing off from the jarring of parts.

The height of rib $c$ or $d$ need not exceed one-quarter the distance between the threads of the bolt or nut, in which case the nut can be screwed down until it finds a positive solid bearing, with the washer lying flat between the nut and the part to which it is applied, because when the forward edge of the groove $b$ reaches the highest point on the rib, it can be turned far enough beyond this point to bring the rib fully into the groove without shortening the distance between the head of the bolt and the nut, and yet the nut is held from returning or backing by the elasticity of the washer.

By using the supplemental washer E, I am enabled to use a lighter locking-washer than I could otherwise do, from the fact that the inner washer sustains nearly all of the strain, the outer one doing little else than to take up the slack in case parts become loosened.

It is difficult, many times, to secure the washer upon the part to which it is applied in such manner that the nut may be properly locked, but, by the use of washer D, in combination with the bolt B having a flat side, the difficulty is entirely obviated, the nut and bolt being free to turn, but their relation to each other being always the same, or, if desired, the washers C may be held from turning by making the slot $c$ so narrow as to bear against the flat side of the bolt.

Having thus described my invention,

What I claim as new, and desire to secure by Letters Patent, is—

1. The combination of the bolt A, nut B, and washers C E or washer D, constructed and operating substantially as set forth.

2. The elastic elliptic washer C, provided with an elongated slot, substantially as described.

EDWIN R. SHEPARD.

Witnesses:
 JOHN WHITE,
 H. H. DOUBLEDAY.